United States Patent

[11] 3,544,723

[72] Inventor Ralph N. Battista
Colts Neck, New Jersey

[21] Appl. No. 779,856
[22] Filed Nov. 29, 1968
[45] Patented Dec. 1, 1970
[73] Assignee Bell Telephone Laboratories, Incorporated
Murray Hill, New Jersey
a corporation of New York

[54] TONE DETECTOR
16 Claims, 4 Drawing Figs.

[52] U.S. Cl. .......... 179/15, 179/84; 328/138; 329/145
[51] Int. Cl. .......... H04m 1/50
[50] Field of Search .......... 179/84(VF), 15, 15(Inquire); B25/466; 329/145 328/136, 137, 138

[56] References Cited

UNITED STATES PATENTS

| | | | |
|---|---|---|---|
| 2,484,352 | 10/1949 | Miller | 328/112 |
| 2,716,189 | 8/1955 | Ayres | 328/138X |
| 3,292,093 | 12/1966 | Clarke | 329/145X |
| 3,358,086 | 12/1967 | Bereznak | 179/84(VF) |
| 3,392,337 | 7/1968 | Neuburger | 329/145 |

*Primary Examiner*—Ralph D. Blakeslee
*Attorneys*—R. J. Guenther and James Warren Falk

ABSTRACT: An inband tone signal detector is described in which an incoming signal is compared to its derivative after the derivative is delayed for a fixed time. The result of the comparison is evaluated to detect the occurrence of only the tone signal in the incoming signal. The detector operates on the principle that only the derivative of a sinusoid signal delayed for 1/4-cycle of the sinusoid frequency is directly proportional to the sinusoid.

INVENTOR
R. N. BATTISTA
BY J S Cubert
ATTORNEY

TONE DETECTOR

BACKGROUND OF THE INVENTION

My invention is related to signaling arrangements and more particularly to inband signaling schemes in communications systems.

In voice communications systems wherein stations are selectively interconnectable through a switching network, a signaling arrangement is required to transmit information which controls the interconnections of stations. While such signaling may be accomplished outside the voice frequency band, it is often desirable to utilize inband signaling so that a common transmission path may be used for both voice transmission and signaling. Inband signaling advantageously provides means for ensuring a completed voice transmission path and is unaffected by the different types of transmission media that may be encountered along the transmission path between stations.

In one form of inband signaling well known in the art, a single frequency tone modulated in accordance with interconnection and supervisory information is transmitted via the voice path to network control equipment. This signaling tone is detected by the network control equipment and the control information derived therefrom is used to set up the switching network in accordance with the desired interconnections. Voice signals having components having the signaling tone frequency may be transmitted along the same path. Therefore, the signaling tone detector must be so designed that any tone signal received is distinguished from all types of voice signals. Otherwise voice signals may provide false signaling information to the switching network control equipment. One type of signaling tone detector known in the art utilizes two separate paths for the incoming signal. The first path contains a narrowband filter which severely attenuates all frequencies except those in the neighborhood of the signaling tone frequency. The other path contains a wideband filter which passes all voice signal frequencies except those in the neighborhood of the signaling tone frequency. The other path contains a wideband filter which passes all voice signal frequencies except those in the neighborhood of the signaling tone frequency. The output from each of these paths is applied to a circuit which gates the incoming signal to network control equipment only if the ratio of the amplitude of the narrowband path input to the amplitude of the wideband path input, over a preset period of time, is greater than a predetermined value. This provides guard action that prevents operation of network control equipment in response to voice signals.

A second type of tone detector known in the art compares the time of occurrence of immediately successive zero crossings of the incoming signal. Narrow width pulses are generated at each zero crossing and these pulses are delayed by one half-period of the expected signaling tone frequency. The delayed pulses are compared to the immediately received zero crossing pulses. Coincidence of the just-received pulses and the delayed pulses over a prescribed period of time is indicative of the presence of only the single signaling tone frequency. It is possible, however, for voice signals to have the desired zero crossing property. In this event, false signals may be derived from incoming voice signals and transmitted to associated network control equipment. Thus, because only a limited portion of the incoming signal is inspected, this type of circuit may result in erroneous signal detection.

SUMMARY OF THE INVENTION

My invention is an inband signaling circuit that detects the presence of only a signaling tone in an incoming signal. An incoming signal received from a line is applied to one input of a comparator device and to a derivative forming network. The output of the derivative forming network is delayed for a fixed period and the delayed derivative signal therefrom is applied to the other input of the comparison device. The output of the comparison device is in turn applied to a circuit which produces a signal indicating the presence of only the signaling tone when the comparison device output is less than or equal to a predetermined value.

According to one aspect of my invention an incoming signal is applied to a differentiating network and the output of the differentiating network is delayed for one quarter-period of the expected tone frequency. The delayed differentiated signal and the incoming signal are applied to an analog comparator, the output of which is further compared to a predetermined signal. This predetermined signal is arranged to allow some deviation from the expected tone frequency in the signaling tones.

According to another aspect of my invention, the output of an analog comparator is further compared to an allowable deviation signal that is proportional to the magnitude of the derivative of the incoming signal whereby the detection of the signaling tone is made invariant with the incoming signal amplitude.

According to yet another aspect of my invention, the output of an analog comparator is applied to a peak detector and the allowable deviation signal, which is proportional to the incoming signal, is applied to another peak detector. The outputs of the two peak detectors are in turn compared to determine the presence of the signaling tone.

According to yet another aspect of my invention an incoming signal is applied to a transmission gate wherein it is repeatedly sampled. The samples are encoded into a succession of PCM codes. Each pair of successive codes is subtracted to form a code corresponding to the derivative of the incoming signal. This derivative code is delayed for one quarter-period of the expected signaling frequency and is applied to one input of a code comparator. Each code received directly from the encoder is scaled and applied to the second input of the comparator. The output code of the comparator is applied to a second comparator which generates a signal only if the output code is less than a predetermined maximum error code. The successive signals from the comparator, which signals indicate the presence of only a signaling tone, are sequentially stored for a fixed period. An output from the detector is generated when a predetermined number of comparator output signals corresponding to a given incoming signal are stored within the fixed period.

According to still another aspect of my invention, a plurality of incoming signals are applied to a time division multiplex transmission gate and each signal is repeatedly sampled in sequence. As in the last mentioned aspect of my invention, the samples are encoded into successions of PCM codes and signals are derived therefrom which determine the presence of only a single frequency signaling tone in each incoming signal. These derived signals are separated by a second multiplex gate arrangement and a plurality of outputs are obtained which correspond to said plurality of incoming signals.

DETAILED DESCRIPTION

Figure 1:
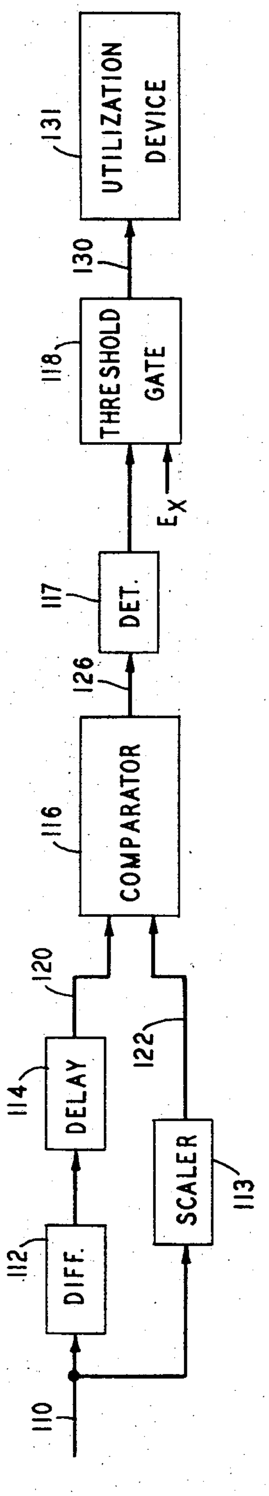
FIG. 1 depicts one embodiment of my invention useful in detecting fixed amplitude signaling tones.

My invention is based on the principle that only the derivative of a sinusoid signal delayed for one quarter cycle of the sinusoid frequency is directly proportional to the sinusoid. In FIG. 1, an incoming signal is applied from line 110 to differentiator 112 which may be a resistor-capacitor differentiating network or another type of derivative forming network well known in the art. The incoming signal is also applied via scaling circuit 113 and lead 122 to comparator 116. The output of the differentiator 112 is substantially the time derivative of the incoming signal. This time derivative signal is applied to delay 114 which delays it for one quarter-period of the expected signaling tone. The delayed derivative signal is then transmitted to comparator 116 via lead 120. Comparator 116 may be an amplifier circuit adapted to subtract the signal appearing on lead 120 from the signal appearing on lead 122.

Where the incoming signal is a sinusoid of frequency $\omega_0$ $$v(t)=A \sin \omega_0 t \qquad (1)$$

the derivative $$\frac{dv}{dt}=\omega_0 A \cos \omega_0 t=\omega_0 A \sin\left(\omega_0 t+\frac{\pi}{2}\right) \text{ and} \qquad (2)$$

the delayed derivative $=\omega_0 A \sin \omega_0 t$.

Thus if scaling circuit 113 operates to multiply the incoming signal by a constant $\omega_0$, the amplitude of the inputs to comparator 116 are identical and a zero output signal is obtained therefrom. Alternatively, scaling circuit 113 may be inserted between delay 114 and comparator 116 to attenuate the delayed derivative signal by a factor of $\omega_0$. If the incoming signal is a voice signal comprising a plurality of different frequency components, the incoming signal is not a pure sinusoid and the output of comparator 116 is other than zero.

The output of comparator 116 is applied to peak detector 117. The d.c. voltage therefrom represents the peak deviation from the expected sinusoidal signal. This is so because the delayed derivative of the received voice signal is a complex waveform and therefore is not directly proportional to the received voice signal. As is well known, a relationship giving a zero output applies only to single frequency sinusoids. Comparator 116 provides an output signal on lead 126 only when the inputs applied thereto are not identical. The output signal from detector 117 is applied to threshold gate 118 where it is compared to a voltage $E_x$. $E_x$ is a d.c. voltage that represents the maximum permissible frequency deviation of an incoming sinusoidal tone signal in the neighborhood of $\omega_0$. If the output of detector 117 is less than or equal to $E_x$, a permissive signal from gate 118 is transmitted to utilization circuit 131 connected to gate 118 by lead 130. In this way, according to my invention, single frequency signaling tones over a prescribed range of frequencies are distinguished from voice signals so that inband signaling may be accomplished even though voice signals contain the signaling frequency.

Where the incoming signal is a tone of frequency $\omega_0$ the output of comparator 116 is zero regardless of the amplitude of the incoming signal. This is so because delay 114 is set at one quarter-period of $\omega_0$. If, however, the incoming tone signal is an acceptable signaling tone but has a frequency which deviates from $\omega_0$, the peak amplitude of the signal from comparator 116 varies in accordance with the amplitude of the incoming signal. Thus, with a fixed voltage $E_x$ applied to gate 118, a large but acceptable incoming signal which deviates from $\omega_0$ may not pass the validity test. The circuit of FIG. 1 is characterized by a very narrow passband for tone signals which is amplitude sensitive. In some applications, however, it is desirable to accept signal tones within a specified neighborhood of the expected tone frequency $\omega_0$ independent of the amplitude of the incoming tone. This may be accomplished by making the voltage $E_x$ a variable quantity that is proportional to the peak amplitude of the derivative of the incoming signal. Since the derivative signal varies in a prescribed manner with the incoming signal, the tone detection need not depend on the amplitude of the incoming signal.

Figure 2:
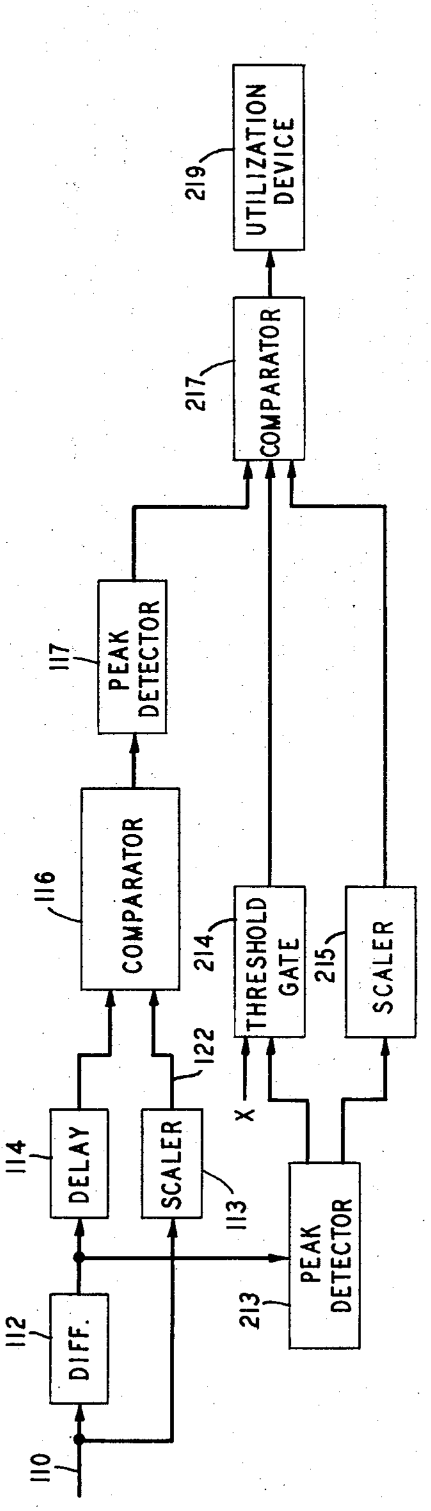
FIG. 2 depicts another embodiment of my invention useful in detecting signaling tones of varying amplitude.

The tone detector of FIG. 2 is constructed to provide tone detection over a range of acceptable tone frequencies as long as the amplitude of the incoming signal is within prescribed limits. These limits may, for example, be determined by electrical noise. As in the circuit of FIG. 1, the incoming signal is applied to line 110 and is transmitted through differentiator 112 and delay 114 to comparator 116. It is also transmitted via scaler 113 and lead 122 to comparator 116. The peak value of the output of comparator 116 appears at the output of peak detector 117 and is applied therefrom to one input of comparator 217. Detector 117 operates to store the peak amplitude of the signal from comparator 116. Another input of comparator 217 is not fixed as in FIG. 1. Instead the derivative of the incoming signal is applied to this other input from differentiator 112 via peak detector 213 and scaler 215 so that the output of detector 117, which represents the deviation from a sinusoidal tone of frequency $\omega_0$, is compared to a maximum permissible deviation that is proportional to the derivative of the incoming signal. In this way the tone detector of FIG. 2 operates independently of the amplitude of the incoming signal over a predetermined frequency range.

In addition to the comparisons made in comparator 217, it is desirable to permit only signals having amplitudes greater than a prescribed value pass the tone detector test. In FIG. 2, this is accomplished through the use of threshold gate 214. This gate receives all incoming signals via peak detector 213 and compares the peak value of such signals to a voltage X representing the minimum acceptable tone amplitude. If the incoming signal peak amplitude is less than this prescribed minimum, a signal is transmitted from gate 214 to comparator 217 to inhibit the operation of comparator 217. Thus, the tone detector operates to discriminate between acceptable incoming signals and noise or other unwanted signals.

The output of comparator 217 is applied to utilization device 219, which may be a switching network control circuit, if the incoming signal contains only an acceptable signaling tone within predetermined limits of amplitude and frequency. The output signal from comparator 217 indicates the presence of a signaling tone in the absence of voice signals.

Figures 3, 4:
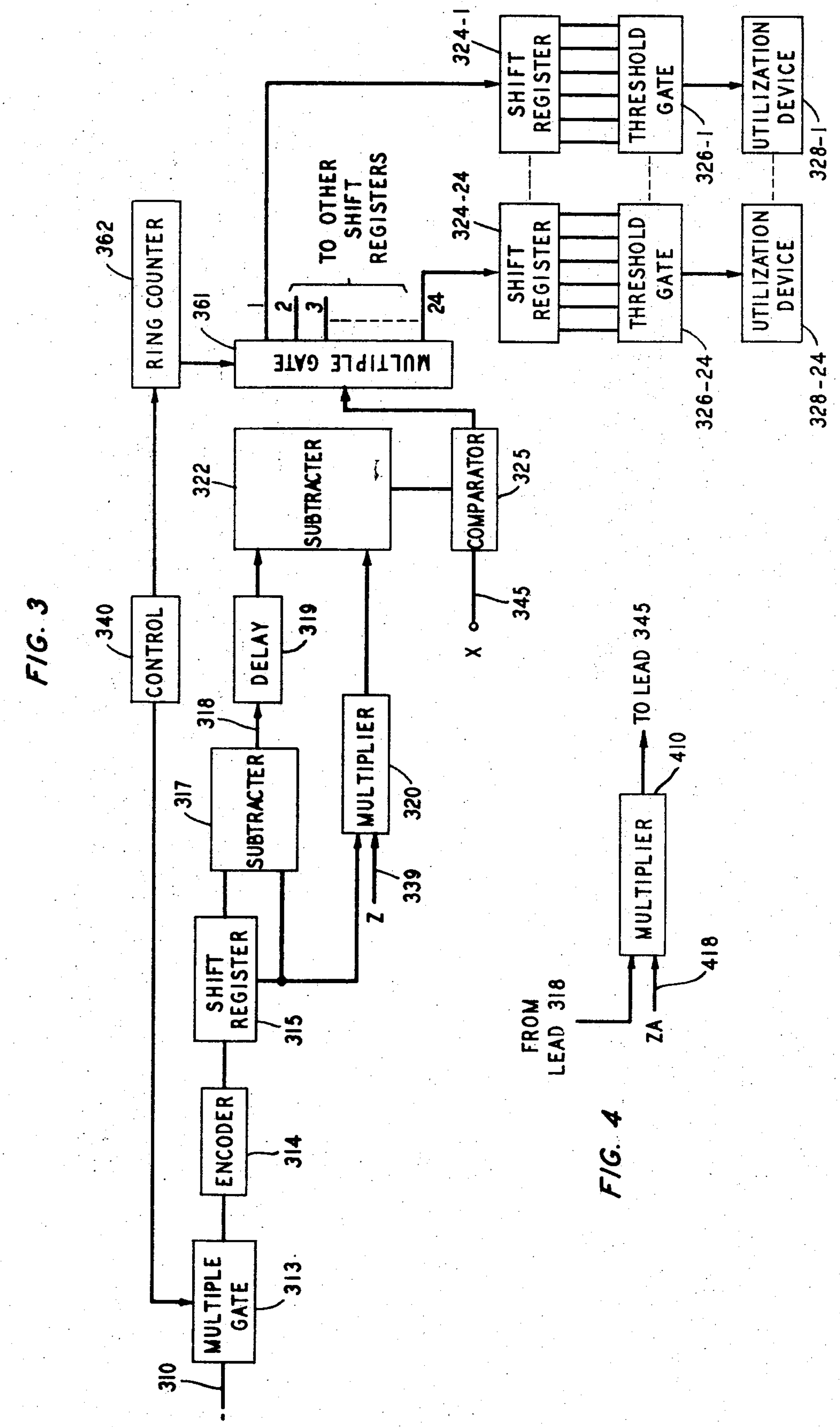
FIG. 3 depicts another embodiment of my invention in which a plurality of fixed amplitude signaling tones are detected in a time division multiplex arrangement.
FIG. 4 shows additional devices which may be combined with the embodiment of FIG. 3 so that a plurality of signaling tones of varying amplitudes are detected in a time division multiplex arrangement.

The tone detector of FIG. 3 operates in a digital manner to provide tone detection. Such digital detection may be accomplished in the incoming signal is repeatedly sampled at a sufficient rate to provide an accurate representation of the incoming signal and its derivative. Assume the incoming signal is $$v=\sin 2\pi F_0 t \qquad (3)$$

the derivative of the incoming signal may be represented as $$\frac{dv}{dt}=2\pi F_0 \sin\left(2\pi F_0 t+\frac{\pi}{2}\right) \qquad (4)$$

In accordance with well known mathematical principles the derivative $\frac{dv}{dt}$ may be approximated by $$\frac{V_n-V_{n-1}}{S} \qquad (5)$$

where $V_n$ and $V_{n-1}$ represent samples taken at regular intervals at times $T_n$ and $T_{n-1}$ and S represents the sampling interval. At time $T_n$ for sufficiently small values of sampling intervals, Expression (5) then accurately represents the derivative of the sinusoid of Equation (3) so that $$\frac{V_n-V_{n-1}}{S}\approx 2\pi F_0 \sin\left(2\pi F_0 T_n+\frac{\pi}{2}\right) \qquad (6)$$

Where $V_{n+k}$ represents the signal amplitude one quarter-period after $T_n$ and $k$ is the number of sampling intervals in one quarter-period of the expected sinusoidal frequency $$\sin\left(2\pi F_0 T_n+\frac{\pi}{2}\right)=V_{n+k} \qquad (7)$$

Substituting Equation (7) into Equation (6), $$\frac{V_n-V_{n-1}}{S}\approx 2\pi F V_{n+k} \qquad (8)$$

In equation (8) it is desirable to have a whole number of sampling intervals S in one quarter-period so that $k$ is an integer. This may be expressed as $$S=\frac{1}{4kF} \qquad (9)$$

If Equation (9) is substituted into Equation (8), $$V_n-V_{n-1}\approx \frac{\pi}{2k} V_{n+k} \qquad (10)$$

Equation (10) may then be implemented to provide a test for distinguishing single frequency sinusoidal signaling tones from voice signals.

The circuit of FIG. 3 advantageously employs time division multiplexing to permit detection of tones on a plurality of incoming lines. It is to be understood however that the circuit of FIG. 3 may be arranged to digitally detect a single incoming signal. Referring to FIG. 3, cable 310 which contains a plurality of incoming lines is connected to time division multiple gate 313. It is assumed for purposes of illustration that there are 24 incoming lines connected to gate 313. Gate 313 successively samples each line in each multiplex interval and applies the instantaneous amplitude of the incoming signal on each line to encoder 314. This is done in response to pulses from control 340 which define time division multiplex intervals. The pulses from control 340 are applied to gate 313. Encoder 314 operates on each amplitude sample and generates a succession of pulse code modulated codes corresponding to each of the successive samples. Additionally encoder 314 may be arranged to produce zero valued PCM codes for incoming signals below a predetermined acceptable minimum.

Assume for purposes of illustration that the expected signaling tone on each line is a sinusoid having a frequency $F_0$ of 2600 Hz. The period of $F_0$ is then 384 microseconds and one quarter-period is 96 microseconds. Assume further that each line is sampled $k$ times per quarter-period of $F_0$, and that $k$ equals 5. Therefore each line is sampled once every 19.2 microseconds. For any one line, the validity test of Equation (10) is satisfied if $V_n - V_{n1}$ is approximately equal to 0.314 $V_{n+5\alpha 8}$.

In FIG. 3 with 24 lines, the successive inputs to encoder 314 occur at the rate of one every 0.8 microseconds and the samples corresponding to any one line are spaced every 24 multiplex intervals. The successive outputs of encoder 314 are applied to a 25-stage shift register 315. The 25of codes stored in stages 1 and 25 of register 315 correspond to two immediately successive samples from one of the 24 lines. When the next code from encoder 314 is stored in register 315, the new stored codes in stages 1 and 25 of register 315 will correspond to two successive samples taken from the next line, etc. Each pair of stored codes in stages 1 and 25 of register 315 is applied to subtractor 317. If only one incoming line is connected to gate 313, register 315 need only be a two-stage shift register which stores successive pairs of codes derived from immediately successive samples from gate 313. The output code from subtractor 317 approximates the derivative of the incoming signal and represents the left-hand side of Equation (10) prior to delay. The just received code stored in stage one of shift register 315 is also applied to multiplier 320 which operates to appropriately scale the sampled voltage by the factor $\frac{\pi}{2k}$. The scale factor $\frac{\pi}{2k}$ is contained in a code Z which code is applied to lead 339. In this way the output of multiplier 320 represents the right-hand side of Equation (10). The scaled code from multiplier 320 is applied to one input of subtractor 322. After the output of subtracter 317 is delayed in delay 319 for one quarter-period of $F_0$, or 120 multiplex intervals in this illustration, it is applied to the other input of a second subtracter 322. This input now represents the left-hand side of Equation (10). In FIG. 3 subtracter 322 is used as a comparator to compare the delayed derivative code from delay 319 with the sealed incoming signal code from multiplier 320. Subtracter 322 operates to subtract the absolute magnitude of output code from multiplier 320 from the absolute magnitude of output code from delay 319. In this way only the magnitudes of the two codes are subtracted.

The output of subtracter 322 is a code indicating the deviation of the incoming signal from a sinusoid of frequency $F_0$. This code is transmitted to comparator 325 wherein it is compared to a fixed value or standard code X which represents the maximum permissible deviation for an acceptable tone signal. If the code from subtracter 322 is equal to or less than standard code X, a binary "one" signal is generated in comparator 325 and sent to multiple gate 361. If the code is greater than the constant value X, a binary "zero" signal is sent to gate 361. Multiple gate 361 is activated by the 24-stage ring counter 362 which is in turn advanced one stage every multiplex interval by pulses from control 340. Each of stages 1 through 24 of ring counter 362 is associated with a predetermined incoming line in cable 310. When a particular stage of ring counter 362 is activated, it opens the corresponding gate of multiple gate 361 and allows a signal from comparator 325 to be stored in one of shift registers 324-1 through 324-24. Each of these shift registers stores the successive tone indicating signals for one of the 24 lines, as received from comparator 325. For example, shift register 324-1 stores signals for line 1.

The outputs of each register, such as 324-24, are applied in parallel to corresponding gate 326-24 which operates as a threshold device. Gate 326-24 transmits a permissive signal to corresponding utilization device 328-24 if at least a certain number of successful comparisons are made within a prescribed interval. Thus, if it is required that the signals from 15 successful comparisons out of 20 be present in shift register 324-24 to operate corresponding device 328-24, gate 326-24 provides a permissive signal only under these conditions. It is to be understood that the shift registers connected to lines 1-23 and the associated threshold gates and utilization devices operate in substantially the same manner. As a result of the operation of the circuit of FIG. 3, the utilization devices attached thereto respond to the presence of only signaling tones on the associated incoming line of cable 310. If only one incoming line is used, ring counter 362 and gate 361 are not required and only one shift register (e.g. 324-24) and one threshold gate (e.g. 326-24) are connected between comparator 325 and a utilization device (e.g. 328-24).

As discussed with respect to FIG. 1, it is apparent that the receipt of acceptable tone signals having frequencies other than $F_0$ results in output codes from subtracter 322 which may vary with the amplitude of the received tone. A large tone signal having a frequency other than $F_0$ produces a larger value code. Since a fixed value code X is used as a comparison standard, this results in some acceptable tone signals passing the validity test while other acceptable signals, having large amplitudes or greater frequency deviation, fail the test.

The multiplier circuit of FIG. 4 may be connected between leads 318 and 345 of FIG. 3 so that the output of subtracter 322 is compared to a code proportional to the absolute magnitude of input signal derivative rather than to a fixed value code X. This proportional code is now the standard code to which the derived error code from subtracter 322 is compared. The use of multiplier 410 makes the detector of FIG. 3 insensitive to amplitude variations in incoming signaling tones. Multiplying factor code ZA is applied to lead 418 so that the output of multiplier 410 is a maximum possible deviation signal that varies in accordance with the derivative of the incoming signal. The variation in derivative signal on lead 318 in turn corresponds to the variations in incoming signal amplitude. This arrangement compares the output of subtracter 322 with a code which is directly proportional to the code representing the absolute magnitude derivative of the immediately received incoming signal amplitude. Thus the code applied to lead 345 represents the maximum permissible deviation signal derived from a variable amplitude sinusoidal incoming signal over a predetermined frequency range in the neighborhood of $F_0$. As in FIG. 2, variations in incoming signal amplitude are compensated and do not affect the operation of the tone detector.

While my invention has been described with reference to particular embodiments, it is to be understood that these embodiments are illustrative only and that numerous other arrangements may be devised by those skilled in the art without departing from the scope and spirit of the invention.

I claim:

1. A circuit for detecting a tone signal in an incoming signal comprising means for forming a signal corresponding to the derivative of said incoming signal, means for delaying said derivative signal for a fixed period of time, means for comparing a signal proportional to said incoming signal with said delayed derivative signal, and means responsive to the output of said comparing means for selectively producing a signal indicative of the presence of only said tone signal in said incoming signal.

2. A circuit for detecting a tone signal in an incoming signal according to claim 1 further comprising means for deriving a predetermined signal and wherein said signal-producing means comprises means for comparing said predetermined signal to said comparing means output.

3. A circuit for detecting a tone signal in an incoming signal according to claim 1 wherein said delaying means comprises a delay of one quarter-period of the expected frequency of said tone signal.

4. A circuit for detecting a tone signal in an incoming signal according to claim 3 wherein said comparing means comprises means for subtracting said delayed derivative signal from said proportional signal and said signal-producing means is responsive to the magnitude of said comparing means output.

5. A circuit for detecting a tone signal in an incoming signal according to claim 4 further comprising means for detecting the peak amplitude of said comparing means output and wherein said signal-producing means comprises means for comparing said peak amplitude with a fixed value signal.

6. A circuit for detecting a tone signal in an incoming signal according to claim 3 wherein said comparing means includes first and second inputs and an output, said incoming signal being coupled to said first input and said second input being coupled to said delaying means, and further comprising means for detecting the peak amplitude of the signal from said comparing means output and means for detecting the peak amplitude of said derivative signal, the output of each of said peak amplitude detecting means being coupled to said signal producing means.

7. A circuit for detecting a tone signal in an incoming signal according to claim 6 wherein said signal-producing means comprises means for comparing said derivative signal peak amplitude with said comparator output signal peak amplitude.

8. A circuit for detecting a tone signal in an incoming signal comprising means for repetitively sampling an incoming signal, means connected to said sampling means for generating a code corresponding to each sample from said sampling means, means connected to said generating means for storing successive pairs of codes from said generating means, first means for subtracting the first stored code of each successive pair from the second stored code of each successive pair, means for delaying the output code from said subtracting means for a predetermined time, means for scaling the second stored code, second means for subtracting said delayed first subtracting means output code from said scaled second stored code and means for producing a signal indicative of the magnitude of the output code from said second subtracting means.

9. A circuit for detecting a tone signal in an incoming signal according to claim 8 wherein said signal-producing means comprises means for comparing said second subtracting means output code with a fixed value code.

10. A circuit for detecting a tone signal in an incoming signal according to claim 8 further comprising means for deriving a code proportional to said first subtracting means output code and wherein said signal-producing means comprises means for comparing said second subtracting means output code with said derived code.

11. A circuit for detecting a tone signal in an incoming signal according to claim 10 wherein said deriving means further comprises means connected between said first subtracting means and said comparing means for multiplying said subtracting means output code by a constant value code.

12. A circuit for detecting a tone signal in an incoming signal according to claim 8 further comprising means for storing successive signals from said signal producing means, and gating means operative in response to the presence of a minimum number of said stored signals in said successive signal-storing means to generate a signal indicating the presence of only a tone signal in said incoming signal.

13. A circuit for detecting tone signals comprising means for time division multiplexing a plurality of incoming signals to gate each incoming signal in successive time intervals, means for sampling each gated incoming signal from said multiplexing means during the associated time interval, means for generating a code corresponding to the amplitude of each sample from said sampling means, means for deriving a code proportional to the difference between successive sampling codes corresponding to each incoming signal, means for delaying said difference code for a predetermined time, means for subtracting said delayed difference code from the just generated sampling code, means for deriving a standard code, and means for comparing said subtracting means output code with said standard code, said comparing means being operative to produce an output signal for each incoming signal only if said subtracting means output code corresponding to said incoming signal is less than or equal to said standard code.

14. A circuit for detecting tone signals according to claim 13 wherein said means for deriving said standard code comprises means for applying a fixed value code.

15. A circuit for detecting tone signals according to claim 13 wherein said means for deriving said standard code comprises means for producing a code proportional to said just generated difference code connected between said difference deriving means and said comparing means.

16. A circuit for detecting tone signals according to claim 13 further comprising a plurality of means each for storing successive output signals corresponding to each incoming signal from said comparing means in each associated time interval and gating means operative to produce an output signal in response to the presence of at least a predetermined number of said comparing means output signals in said output signal-storing means.